United States Patent
Lee et al.

(10) Patent No.: US 11,295,415 B2
(45) Date of Patent: Apr. 5, 2022

(54) IMAGE FORMING APPARATUS, SCANNED IMAGE CORRECTION METHOD THEREOF, AND NON-TRANSITORY COMPUTER-READABLE RECORDING MEDIUM

(71) Applicant: HP PRINTING KOREA CO., LTD., Suwon-Si (KR)

(72) Inventors: Hae-kee Lee, Suwon-si (KR); Jung-tag Gong, Suwon-si (KR); Chang-hyung Lee, Suwon-si (KR); Ho-keun Lee, Suwon-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 34 days.

(21) Appl. No.: 16/325,948

(22) PCT Filed: Jun. 16, 2017

(86) PCT No.: PCT/KR2017/006288
§ 371 (c)(1),
(2) Date: Feb. 15, 2019

(87) PCT Pub. No.: WO2018/034414
PCT Pub. Date: Feb. 22, 2018

(65) Prior Publication Data
US 2019/0180415 A1    Jun. 13, 2019

(30) Foreign Application Priority Data
Aug. 17, 2016  (KR) .................. 10-2016-0104342

(51) Int. Cl.
*G06T 3/60* (2006.01)
*H04N 1/00* (2006.01)
*H04N 1/387* (2006.01)

(52) U.S. Cl.
CPC ............... *G06T 3/60* (2013.01); *H04N 1/00* (2013.01); *H04N 1/387* (2013.01); *H04N 1/3878* (2013.01)

(58) Field of Classification Search
CPC . G06T 3/60; G06T 3/608; H04N 1/00; H04N 1/387; H04N 1/3878; H04N 1/3876; H04N 1/3877
See application file for complete search history.

(56) References Cited

U.S. PATENT DOCUMENTS

| 9,110,926 B1 | 8/2015 | Natarajan et al. |
| 2005/0271296 A1 | 12/2005 | Tsuji et al. |

(Continued)

FOREIGN PATENT DOCUMENTS

| CN | 101170627 | 4/2008 |
| CN | 101567955 | 10/2009 |

(Continued)

*Primary Examiner* — Srilakshmi K Kumar
*Assistant Examiner* — Umair Ahsan
(74) *Attorney, Agent, or Firm* — Staas & Halsey LLP

(57) ABSTRACT

An image forming apparatus, a scanned image correction method of an image forming apparatus, and a non-transitory computer-readable recording medium are provided. The image forming apparatus includes a scan unit to scan a document to generate a scanned image and a processor to detect a skew angle of the scanned image, determine a reference point on the basis of a position of a content in the scanned image, and rotate the scanned image around the determined reference point to correct the skew angle.

14 Claims, 17 Drawing Sheets

(56) References Cited

U.S. PATENT DOCUMENTS

| | | | |
|---|---|---|---|
| 2009/0051978 A1* | 2/2009 | Ohashi | H04N 1/387 358/452 |
| 2010/0195933 A1* | 8/2010 | Nafarieh | G06K 9/3275 382/289 |
| 2011/0228342 A1* | 9/2011 | Dolan | G06K 9/3283 358/3.26 |
| 2015/0070734 A1* | 3/2015 | Hagiwara | H04N 1/00774 358/447 |
| 2015/0281519 A1 | 10/2015 | Tsugimura | |
| 2017/0094111 A1* | 3/2017 | Shimahashi | H04N 1/60 |
| 2017/0366705 A1* | 12/2017 | Wada | G06T 5/006 |

FOREIGN PATENT DOCUMENTS

| | | |
|---|---|---|
| CN | 102377901 | 3/2012 |
| JP | 11308437 | 11/1999 |
| JP | 2003259109 | 9/2003 |
| JP | 2010021937 | 1/2010 |
| JP | 2010062924 | 3/2010 |
| KR | 1020110121959 | 11/2011 |
| WO | WO-2011001439 | 1/2011 |

\* cited by examiner

IMAGE FORMING APPARATUS, SCANNED IMAGE CORRECTION METHOD THEREOF, AND NON-TRANSITORY COMPUTER-READABLE RECORDING MEDIUM

CROSS REFERENCE TO RELATED APPLICATIONS

This application is being filed under 35 U.S.C. 0.371 as a PCT national stage of PCT International Application No. PCT/KR 2017/006288 filed on Jun. 16, 2017, which claims the priority benefit of Korean Patent Application No. 10-2016-0104342 filed on Aug. 17, 2016. Both the International Application and the Korean Patent Application are incorporated by reference herein in their entirety.

TECHNICAL FIELD

Apparatuses and methods consistent with the disclosure relate to an image forming apparatus, a scanned image correction method of the image forming apparatus, and a non-transitory computer-readable recording medium, and more particularly, to an image forming apparatus, a scanned image correction method of the image forming apparatus, and a non-transitory computer-readable recording medium capable of suppressing deterioration of an image quality that may occur at the time of performing scanning.

BACKGROUND ART

In accordance with popularization of an image forming apparatus, a scanner, or the like, in case of scanning or copying a document, the necessity for a technology of correcting a scanned image to have a form desired by a user has increased.

Conventionally, various methods of correcting skew in the scanned image have been suggested. However, there was a problem that the skew may not be accurately corrected in a case in which it is difficult to detect a boundary of the document. In addition, there was a problem that complexity is excessively increased in a case in which an entire content of the document is analyzed. In addition, there was a problem that a content of the document is cut due to the correction of the skew.

In addition, there is a problem that orientations of the document may be decided to be different from each other depending on a feature of each language or a type of paragraph. In addition, in case of scanning a thick document such as a book, there is no technology of extracting a boundary from a scanned image, such that there is also a problem that a content of the book is cut off.

DISCLOSURE

Technical Problem

The disclosure provides an image forming apparatus, a scanned image correction method of the image forming apparatus, and a non-transitory computer-readable recording medium capable of correcting skew in a scanned image, adjusting a document orientation, and correcting a profile boundary surface of the document.

Technical Solution

According to an example of the disclosure, an image forming apparatus includes: a scan unit to scan a document to generate a scanned image; and a processor to detect a skew angle of the scanned image, determine a reference point on the basis of a position of a content in the scanned image, and rotate the scanned image around the determined reference point to correct the skew angle.

The processor may detect a boundary of the document from the scanned image and detect the skew angle of the scanned image on the basis of the detected boundary.

The processor may detect the content in the scanned image and detect the skew angle of the scanned image on the basis of a gradient of the detected content, when the boundary of the document is not detected.

The processor may detect the gradient of the content using at least one of a gradient of a character string, a gradient of a line of a chart, and a gradient of a video edge that are included in the scanned image.

The image forming apparatus may further include an input/output unit to display a screen and receive a user input, wherein the processor controls the input/output unit to display a user interface through which one of a plurality of methods of detecting the skew angle of the scanned image is selected, and detects the skew angle of the scanned image by the selected method according to a user input selecting one of the plurality of methods.

The plurality of methods may include a first method of detecting the skew angle by detecting a boundary of the document, a second method of detecting the skew angle by detecting the content in the scanned image, and a third method of performing the first method and performing the second method when the skew angle is not detected.

The scanned image may include a plurality of contents, and the processor may decide sizes and positions of each of the plurality of contents, assign weights to the positions of each of the plurality of contents depending on the sizes of the each of the plurality of contents, and determine the reference point on the basis of the positions of each of the plurality of contents to which the weights are assigned.

The processor may detect a plurality of text regions in the scanned image, and decide a page orientation of the scanned image on the basis of string orientations of each of the plurality of text regions.

The processor may detect a text region having a predetermined text size.

The processor may detect an amount of required rotation from the string orientations of the text regions, and rotate the scanned image in the decided page orientation of the scanned image when the detected amount is larger than a predetermined value.

According to another example of the disclosure, a scanned image correction method of an image forming apparatus includes: generating a scanned image by scanning a document; detecting a skew angle of the scanned image; determining a reference point on the basis of a position of a content in the scanned image; and rotating the scanned image around the determined reference point to correct the skew angle.

The detecting of the skew angle may include: detecting a boundary of the document from the scanned image; and detecting the skew angle of the scanned image on the basis of the detected boundary.

The detecting of the skew angle may further include detecting the content in the scanned image and detecting the skew angle of the scanned image on the basis of a gradient of the detected content, when the boundary of the document is not detected.

In the detecting of the skew angle, the gradient of the content may be detected using at least one of a gradient of a character string, a gradient of a line of a chart, and a gradient of a video edge that are included in the scanned image.

The scanned image correction method may further include displaying a user interface through which one of a plurality of methods of detecting the skew angle of the scanned image is selected, wherein in the detecting of the skew angle, the skew angle of the scanned image is detected by the selected method according to a user input selecting one of the plurality of methods.

The plurality of methods may include a first method of detecting the skew angle by detecting a boundary of the document, a second method of detecting the skew angle by detecting the content in the scanned image, and a third method of performing the first method and performing the second method when the skew angle is not detected.

The scanned image may include a plurality of contents, and the determining of the reference point may include deciding sizes and positions of each of the plurality of contents; assigning weights to the positions of each of the plurality of contents depending on the sizes of the each of the plurality of contents; and determining the reference point on the basis of the positions of each of the plurality of contents to which the weights are assigned.

The scanned image correction method may further include: detecting a plurality of text regions in the scanned image; and deciding a page orientation of the scanned image on the basis of string orientations of each of the plurality of text regions.

The scanned image correction method may further include: detecting an amount of required rotation from the string orientations of the text regions; and rotating the scanned image in the decided page orientation of the scanned image when the detected amount is larger than a predetermined value.

According to still another example of the disclosure, a non-transitory computer-readable recording medium includes a program for executing a scanned image correction method of an image forming apparatus including: generating a scanned image by scanning a document; detecting a skew angle of the scanned image; determining a reference point on the basis of a position of a content in the scanned image; and rotating the scanned image around the determined reference point to correct the skew angle.

Advantageous Effects

As set forth above, according to the diverse examples of the disclosure, it may be possible to correct the skew in a scanned image without generating a loss of the content, and it may be possible to correct the orientation and the profile boundary of the document.

DETAILED DESCRIPTION

Figure 1:
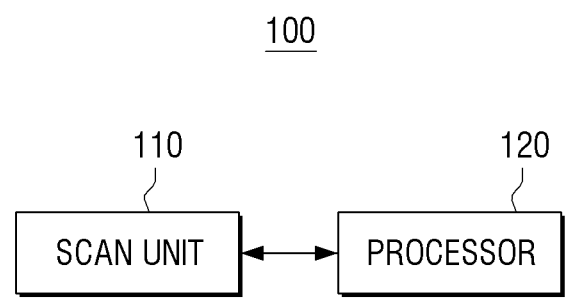
FIG. 1 is a schematic block diagram for describing components of an image forming apparatus according to an example of the disclosure.

Hereinafter, examples of the disclosure will be described in detail with reference to the accompanying drawings. In describing the disclosure, when it is decided that a detailed description for the known functions or configurations related to the disclosure may unnecessarily obscure the gist of the disclosure, the detailed description therefor will be omitted. In addition, terms to be described below are defined in consideration of functions in the disclosure, and may be construed in different ways by users, operators, practices, or the like. Therefore, these terms should be defined on the basis of the contents throughout the specification.

Terms including ordinal numbers such as 'first', 'second', and the like, may be used to describe various components. However, these components are not limited by these terms. The terms are used only to distinguish one component from another component. For example, a 'first' component may be named a 'second' component and the 'second' component may also be similarly named the 'first' component, without departing from the scope of the disclosure. A term 'and/or' includes a combination of a plurality of related items or any one of the plurality of related items.

Terms used in the specification are used to describe examples, and are not intended to restrict and/or limit the disclosure. Singular forms are intended to include plural forms unless the context clearly indicates otherwise. It will be further understood that the terms "include" or "have" used in the specification, specify the presence of features, numerals, steps, operations, components, parts mentioned in the specification, or a combination thereof, but do not preclude the presence or addition of one or more other features, numerals, steps, operations, components, parts, or a combination thereof.

In the specification, an "image forming job" may refer to various jobs (for example, printing, scanning, or faxing) related to an image, such as forming of the image, creating/storing/transmitting of an image file, or the like, and a "job" may refer to not only the image forming job, but also include a series of processes required for performing the image forming job.

In addition, the "image forming apparatus" refers to an apparatus that prints a printing data created in a terminal apparatus such as a computer on a recording paper. An example of such an image forming apparatus may include a copier, a scanner, a printer, a facsimile, a multi-function printer (MFP) in which functions of the copier, the printer, and the facsimile are complexly implemented through one apparatus, or the like.

In addition, a "hard copy" refers to an operation of outputting an image on a printing medium such as a paper, or the like.

Further, "contents" may refer to all kinds of data that become targets of the image forming job, such as a photograph, an image, a document file, or the like.

Further, a "printing data" may refer to a data converted into a format printable in a printer. Meanwhile, when the printer supports direct printing, a file itself may be the printing data.

In addition, a "scan file" may refer to a file generated by scanning an image by the scanner.

Further, a "user" may refer to a person performing a manipulation related to the image forming job using the image forming apparatus or using a device connected to the image forming apparatus in a wired or wireless manner. Further, a "manager" may refer to a person having an authority to access all functions and systems of the image forming apparatus. The "manager" and the "user" may be the same person.

FIG. 1 is a schematic block diagram for describing components of an image forming apparatus 100 according to an example of the disclosure. Referring to FIG. 1, the image forming apparatus 100 may include a scan unit 110 and a processor 120. In addition, although not illustrated, the image forming apparatus 100 may further include a power supply for supplying power to the respective components.

The scan unit 110 may scan a document to generate a scanned image. The scan unit 110 may irradiate light to the document and receive light reflected from the document to read an image recorded on the document. For example, a charge coupled device (CCD), a contact type image sensor (CIS), or the like, may be used as an image sensor reading the image from the document. The scan unit 110 may have a flatbed structure in which the document is positioned at a fixed position and the image sensor reads the image while being moved, a document feed structure in which the image sensor is positioned at a fixed position and the document is fed, and a composite structure of these structures.

The processor 120 may detect a skew angle of the generated scanned image. In addition, the processor 120 may determine a reference point at which it will scan the scanned image, on the basis of a position of a content in the scanned image. The processor 120 may correct the skew angle by rotating the scanned image around the determined reference point.

According to an example of the disclosure, the processor 120 may detect a boundary of the document from the generated scanned image. In addition, the processor 120 may detect the skew angle of the scanned image on the basis of the detected boundary of the document.

According to an example of the disclosure, the processor 120 may detect the content in the scanned image in a case in which it may not detect the boundary of the document due to damage to the document, or the like. In addition, the processor 120 may detect the skew angle of the scanned image on the basis of a gradient of the detected content. For example, the processor 120 may detect the skew angle of the scanned image based on any combination of a gradient of a character string, a gradient of a line included in a chart, and a gradient of an edge of a video such as a photograph that are included in the scanned image.

According to an example of the disclosure, the processor 120 may rotate the scanned image to correct the detected skew angle. The processor 120 may determine a reference point that becomes a center point of the rotation on the basis of a position of the content when it rotates the scanned image. When a plurality of contents is detected within the scanned image, the processor 120 may determine the reference point by assigning weights depending on sizes of each of the plurality of detected contents.

According to an example of the disclosure, in a case in which an orientation of the scanned image does not coincide with a page orientation of the content, the processor 120 may rotate the scanned image in the page orientation of the content. Therefore, readability of the scanned image may be improved.

According to an example of the disclosure, the processor 120 may detect an accurate boundary surface of the document to prevent damage to a profile of a final scan/print resultant.

Meanwhile, simple components constituting the image forming apparatus have been illustrated and described hereinabove, but various components may be further included in the image forming apparatus at the time of implementing the image forming apparatus. Those will be described below with reference to FIG. 2.

Figure 2:
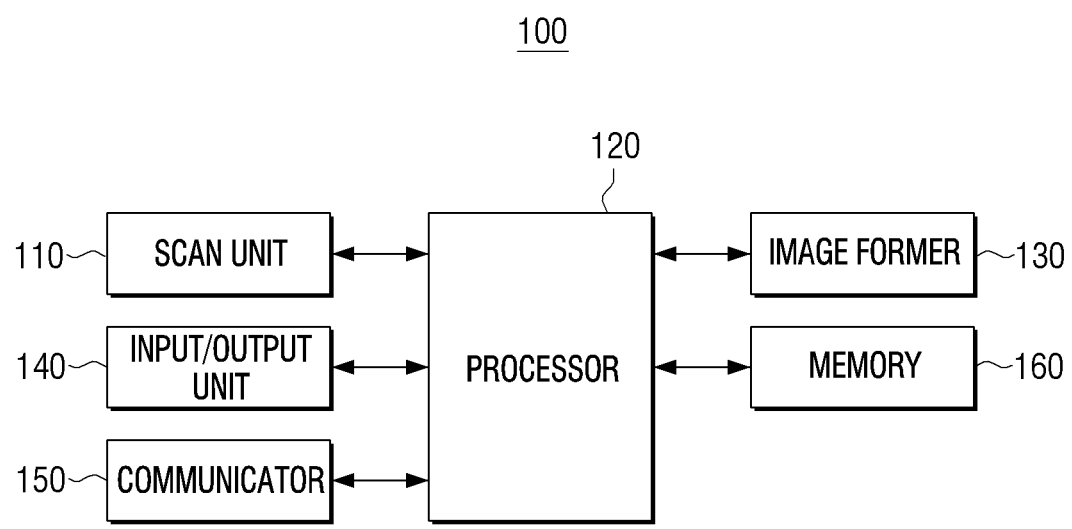
FIG. 2 is a block diagram for describing components of the image forming apparatus according to an example of the disclosure.

FIG. 2 is a block diagram for describing components of the image forming apparatus 100 according to the example of the disclosure in detail. Referring to FIG. 2, the image forming apparatus 100 may include the scan unit 110, the processor 120, an image former 130, an input/output unit 140, a communicator 150, and a memory 160. A description for the scan unit 110 will be omitted.

The processor 120 may control a general operation of the image forming apparatus 100, and include a processor such as a central processing unit (CPU), an application specific integrated circuit (ASIC), or a system on chip (SoC), a memory, a read only memory (ROM), or the like. The processor 120 may control the other components included in the image forming apparatus 100 to perform an operation corresponding to a user input received through the input/output unit 140.

A detailed operation of the processor 120 will hereinafter be described in detail with reference to the drawings.

The image former 130 may print the corrected scanned image. The image former 130 may form the image on a recording medium in various printing manners such as an electrophotographic manner, an inkjet manner, a thermal transfer manner, and a thermal manner.

For example, the image former 130 may form the image on the recording medium by a series of processes including an exposure process, a development process, a transfer process, and a fusing process.

The input/output unit 140 may include an input unit for receiving an input for performing an image forming job from a user and a display for displaying a result obtained by performing the image forming job or information such as a state of the image forming apparatus 100. For example, the input/output unit 140 may include an operation panel receiving the user input, a display panel displaying a screen, and the like.

In detail, the input unit may include devices that may receive various types of user inputs, such as a keyboard, a physical button, a touch screen, a camera, or a microphone. However, the input/output unit 140 is not limited thereto, and may include a device supporting various inputs/outputs.

As an example, the processor 120 may control the input/output unit 140 to display a user interface (UI) through which the user may set a method of detecting the skew angle. In addition, the processor 120 may detect the skew angle by a selected method depending on a user input received through the UI.

As another example, the processor 120 may also display a UI through which the user may set a reference point around which the processor 120 will rotate the scanned image.

The communicator 150 may perform communication with another device or network (for example, a local area network (LAN), the Internet network, or a public switched telephone network (PSTN) network) in a wired or wireless manner. To this end, the communicator 150 may include a communication module supporting at least one of various wired or wireless communication methods. For example, the communication module may have a form of a chipset or may be a sticker/barcode (for example, a sticker including a near field communication (NFC) tag), or the like, including information required for communication.

The wireless communication may include at least one of, for example, wireless fidelity (Wi-Fi), Wi-Fi direct, Bluetooth, ultra wide band (UWB), or NFC. The wired communication may include at least one of, for example, Ethernet, universal serial bus (USB), or high definition multimedia interface (HDMI).

A program such as an application and various types of data such as a scan file may be installed and stored in the memory 160, respectively. The processor 120 may access and use the data stored in the memory 160 or store new data in the memory 160. In addition, the processor 120 may execute the program installed in the memory 160. In addition, the processor 120 may install an application received from an external device through the communicator 150 in the memory 160.

Meanwhile, the memory 160 may be implemented by a storage medium (for example, a hard disk drive (HDD), a solid-state drive (SSD), or the like) in the image forming apparatus 100, an external storage medium such as a removable disk including a USB memory, a web server through a network, or the like.

In addition, only general functions of the image forming apparatus 100 have been illustrated and described in FIGS. 1 and 2, but the image forming apparatus 100 may further include a fax transceiver performing a fax transmitting/receiving function depending on a function supported by the image forming apparatus 100 as well as the components described above.

According to the example of the disclosure, the processor 120 may detect the skew angle of the generated scanned image. The processor 120 may also detect the skew angle on the basis of a boundary of the document. When the processor 120 cannot detect the boundary of the document, the processor 120 may detect the skew angle on the basis of the content in the scanned image.

Figure 3:
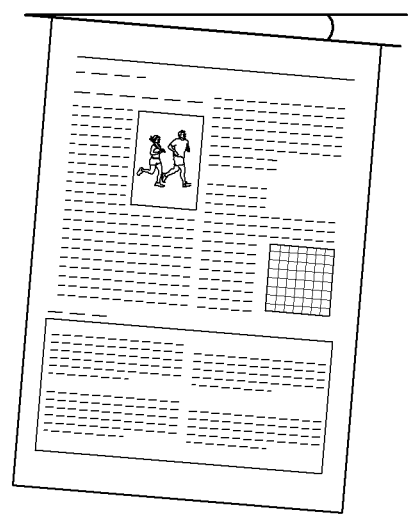
FIG. 3 is an example view illustrating a case in which a skew angle may be detected by detecting the boundary of a document.

FIG. 3 is a view illustrating a case in which a skew angle may be detected by detecting a boundary of a document. For example, the processor 120 may detect the boundary of the document using a shadow value. In the case in which the skew angle is detected from the boundary of the document as illustrated in FIG. 3, the processor 120 may omit a skew angle detection process based on the content in the scanned image. Therefore, the processor 120 may rapidly detect the skew angle of the scanned image.

Figure 4:
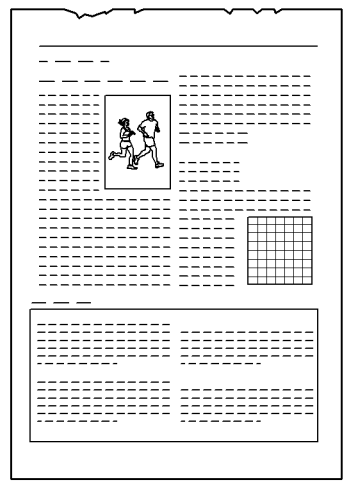
FIG. 4 is an example view illustrating a case in which the boundary of a document is not detected.

In a case in which a profile of the document is damaged as illustrated in FIG. 4, the boundary of the document may not be detected. In this case, the processor 120 may detect the content in the scanned image. In addition, the processor 120 may detect the skew angle of the scanned image on the basis of a gradient of the detected content.

For example, the processor 140 may detect the skew angle of the scanned image using a gradient of a character string, a gradient of a profile of a photograph, a gradient of a line of a table, or the like, which is included in the scanned image illustrated in FIG. 4.

The processor 120 may detect the skew angle by various methods such as a method of detecting the skew angle by detecting the boundary of the document, a method of detecting the skew angle by detecting the content in the scanned image, a method of detecting the skew angle by first detecting the boundary of the document and detecting the content in the scanned image when the boundary of the document is not detected, and the like.

In addition, the processor 120 may provide a plurality of methods of detecting the skew angle to the user, and allow the user to select one of the plurality of methods. For example, the processor 120 may control the input/output unit 140 to display a UI through which the user may select one of the plurality of methods. In addition, the processor 120 may detect the skew angle by the method selected through the UI.

Then, the processor 120 may determine the reference point at which it will scan the scanned image, on the basis of the position of the content in the scanned image. The processor 120 may correct the skew angle by rotating the scanned image around the determined reference point.

Figure 5A:
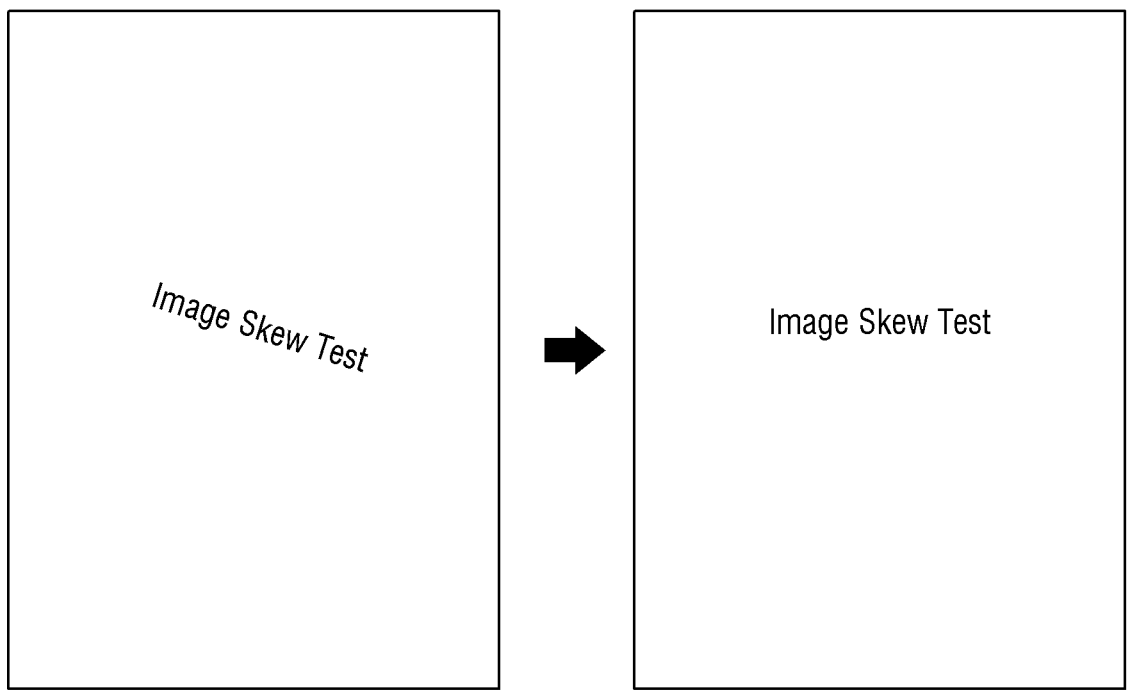
FIGS. 5A to 5C are example views for describing a process of determining a rotation reference point for correcting a skew angle.

In a case in which the content is positioned at a central portion of the scanned image as illustrated in FIG. 5A, even though the processor 120 rotates the scanned image around a central coordinate of the scanned image corresponding to a reference point, a problem of cutting off a part of the content may not occur.

Figure 5B:
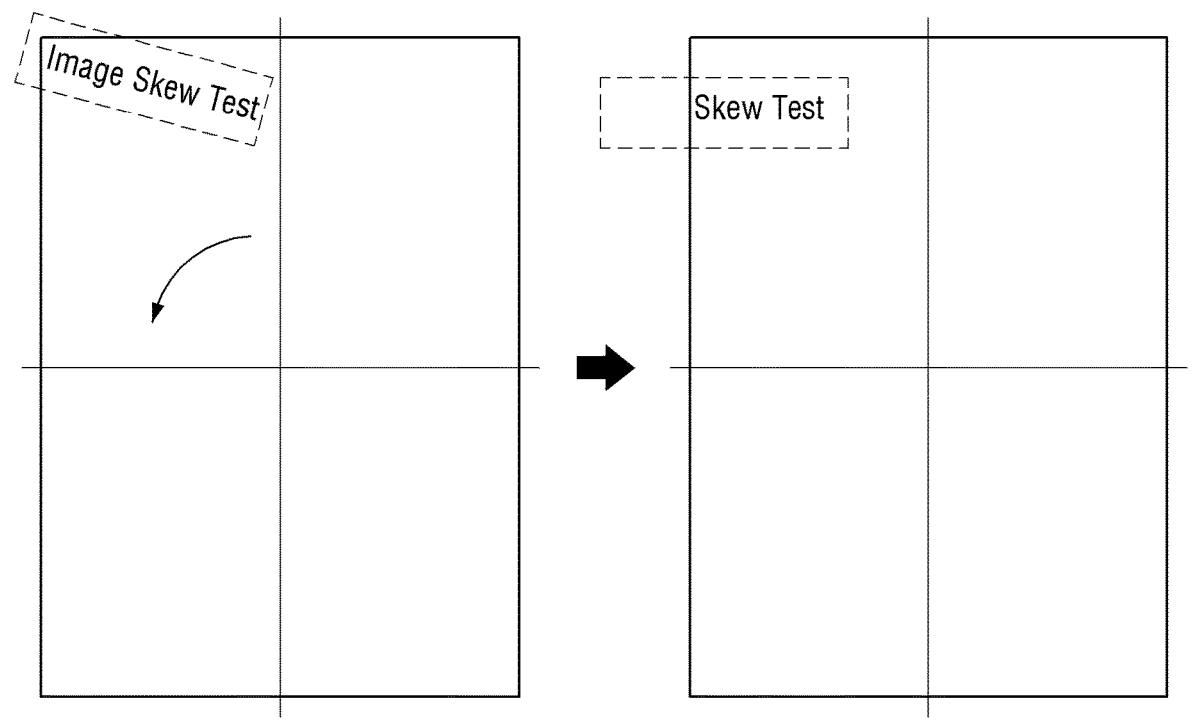

However, in a case in which the content is positioned at a profile portion of the scanned image as illustrated in FIG. 5B, when the processor 120 rotates the scanned image around the central coordinate of the scanned image corresponding to the reference point, a portion of the content may be cut off.

To prevent such a problem, the processor 120 may calculate a coordinate at which the content is positioned in the scanned image. In addition, the processor 120 may determine that the central coordinate of the content is the reference point and rotate the scanned image around the determined reference point.

Figure 5C:
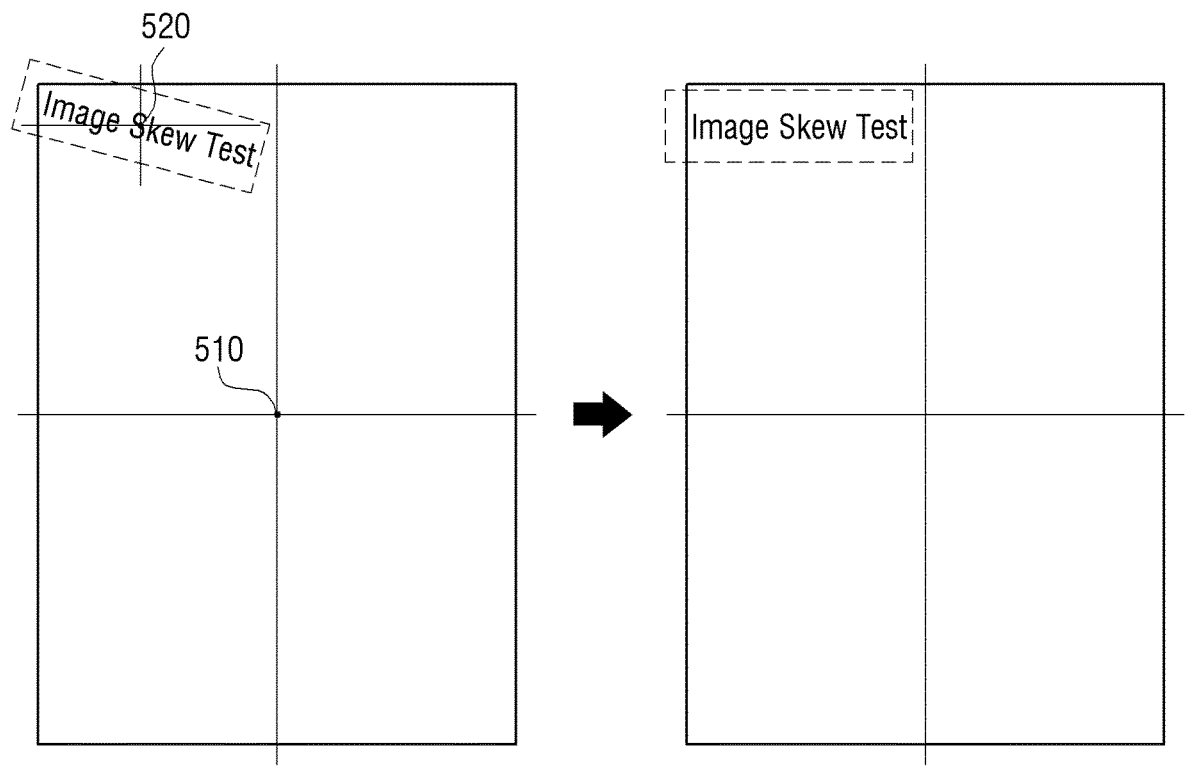

Referring to FIG. 5C, the processor 120 may determine that a central coordinate 520 of the content rather than the central coordinate 510 of the scanned image is the reference point. In addition, the processor 120 may rotate the scanned image by the determined skew angle around the determined reference point. The processor 120 may transfer and output the scanned image of which the skew angle is corrected to the image former 130 or store the scanned image of which the skew angle is corrected in the memory 160.

Figure 6:
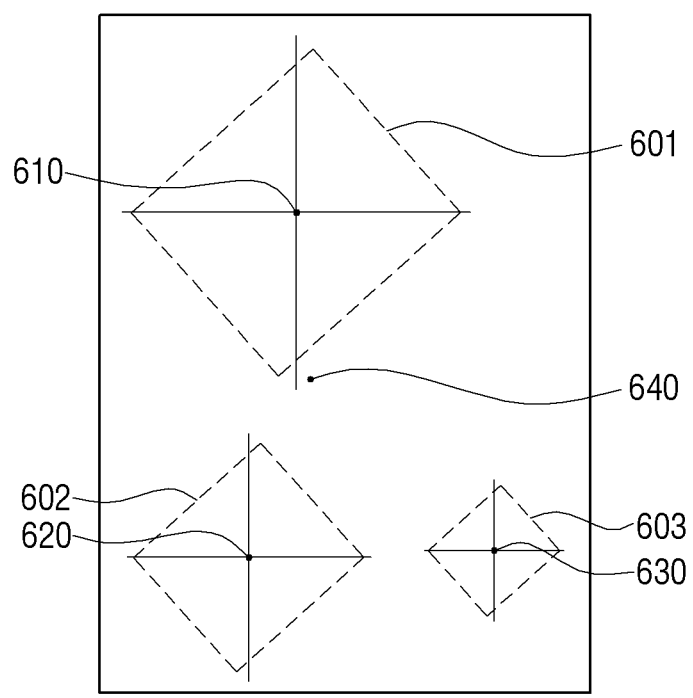
FIG. 6 is an example view for describing a process of determining a rotation reference point in a case in which a plurality of contents is present.

In a case in which a plurality of contents 601, 602, and 603 are detected in the scanned image as illustrated in FIG. 6, the processor 120 may determine the reference point in consideration of sizes of the contents. For example, the processor 120 may determine that a position close to a content having a large size is the reference point by assigning weights depending on the sizes of the contents.

In a case of FIG. 6, the processor 120 may detect the plurality of contents 601, 602, and 603, and calculate central coordinates 610, 620, and 630 of each of the plurality of contents. In addition, the processor 120 may determine the reference point 640 in consideration of the sizes of the contents rather than a simple average value of the calculated coordinates.

According to the example of the disclosure, the processor 120 may correct the orientation of the scanned image so that a document orientation and the orientation of the scanned image coincide with each other. The document orientation or the page orientation refers to an orientation in which a rectangular page is disposed to be appropriate in terms of readability of the page. A page orientation in a case in which the length in a vertical orientation (e.g., height orientation) is larger than the length in a horizontal orientation (e.g., width orientation) is called a portrait-type page orientation, and a page orientation in a case in which the length in the horizontal orientation is larger than the length in the vertical orientation is called a landscape-type page orientation. An appropriate example of the portrait-type page orientation may include a book in which contents are disposed to be elongated in the vertical orientation. An appropriate example of the landscape-type page orientation may include a time line graph in which contents are disposed to be elongated in the horizontal orientation.

The processor 120 may detect an orientation of the content in the scanned image to determine the document orientation or the page orientation. In addition, in a case in which the determined page orientation and a page orientation of a current scanned image are different from each other, the processor 120 may rotate the scanned image by a right angle (e.g., 90°, 180°, or 270°) so that the orientation of the scanned image coincides with the determined page orientation.

According to the example of the disclosure, the processor 120 may detect a plurality of text regions in the scanned image. In addition, the processor 120 may decide the page orientation of the document on the basis of string orientations of each of the plurality of text regions. It is to be noted that the string orientation of the text is different from the page orientation of the document. For example, in a case in which the string orientation of the text is a horizontal orientation in which the text is written to be elongated, a document including the text has a page orientation that is a vertical orientation For example, a description will be provided on the assumption that the scanned image is generated in the vertical orientation (e.g., portrait type). In a case in which an orientation of the detected text region is the horizontal orientation (e.g., in a case in which the text is written in the horizontal orientation), the processor 120 may determine that the page orientation is the portrait-type vertical orientation. Therefore, the processor 120 may not rotate the scanned image by deciding that the orientation of the scanned image coincides with the page orientation of the document.

On the other hand, in a case in which an orientation of the detected text region is the vertical orientation (e.g., in a case in which the text is written in the vertical orientation), the processor 120 may determine that the page orientation is the landscape-type horizontal orientation. Because it is decided that the orientation of the scanned image and the page orientation are different from each other, the processor 120 may rotate the scanned image by a right angle to change the scanned image into the landscape type.

Therefore, in a case in which the document orientation and the orientation of the scanned image are different from each other, the processor 120 may rotate the scanned image to improve readability of the scanned image.

The processor 120 may detect orientations of the respective texts to detect the orientation of a text string or a text line comprising the texts. For example, the processor 120 may detect orientations of the respective texts through optical character recognition (OCR). In detail, the processor 120 may perform the OCR in all of the four orientations, and detect an orientation having the highest probability that a character will be recognized as an orientation of the text. As another example, the processor may calculate a connection angle between the texts and detect the orientation of the text region depending on a gradient of the connection angle.

Because recognition for various languages should be attempted, the processor 120 may detect an orientation mainly with respect to a target having a high recognition rate. As an example, the processor 120 may attempt to detect an orientation with respect to a text region having a predetermined size range. As another example, the processor 120 may attempt to detect an orientation with respect to a text having a predetermined text size.

In addition, the processor 120 may detect an amount of required rotation from string orientations of the respective text regions. When the detected amounts are larger than a predetermined value, the processor 120 may rotate the scanned image in the decided page orientation of the scanned image. For example, the processor 120 may detect sizes of text regions of which string orientations coincide with the document orientation. In addition, when the detected sizes of the text regions exceed a half of a size of a content region included in the document, the processor 120 may perform a correction process of rotating the scanned image.

Figure 7A:
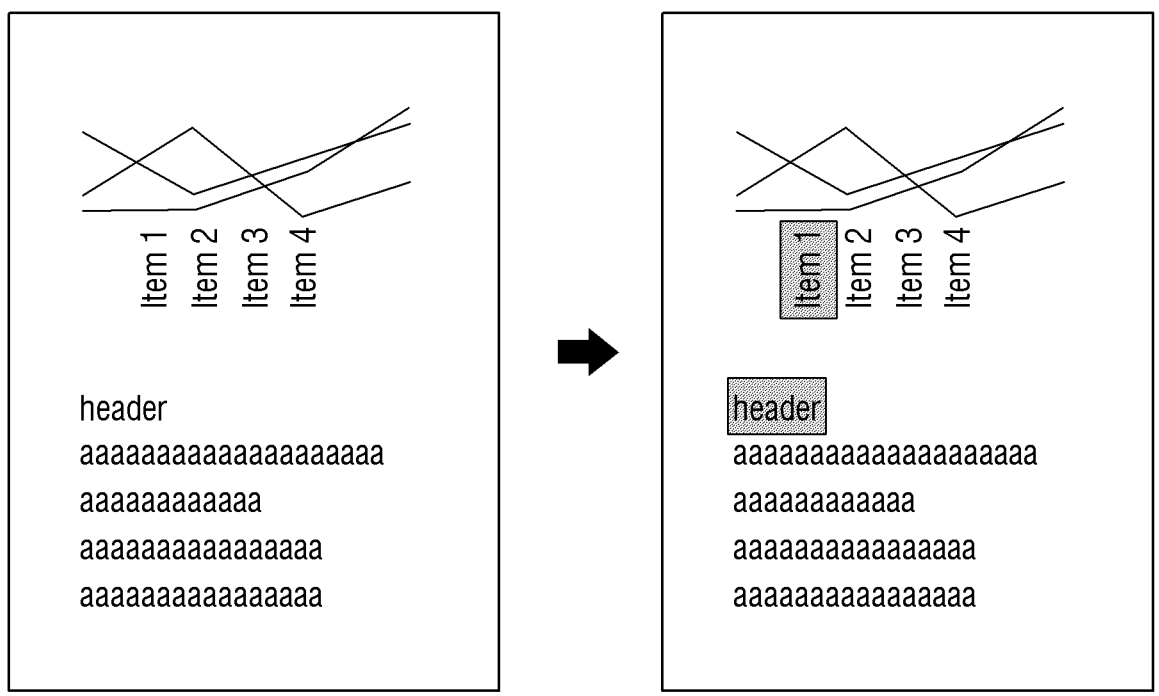
FIGS. 7A to 7C are example views for describing a process of determining an orientation of a scanned image.

Referring to FIG. 7A, the processor 120 may decide an orientation of the document by extracting only representative texts for each paragraph. For example, the processor 120 may decide that a lower paragraph is a paragraph in which texts are written in the horizontal orientation on the basis of only a text "header". In addition, the processor 120 may decide that an upper paragraph is a paragraph in which texts are written in the vertical orientation on the basis of only a text "Item 1".

In addition, the processor 120 may determine which orientation occupies a majority on the basis of sizes of regions of the respective decided paragraphs. In an example of FIG. 7A, the processor 120 may compare a size of the lower paragraph including the "header" and a size of the upper paragraph including the "Item 1" with each other. Because the size of the lower paragraph including the "header" is larger than that of the of the upper paragraph including the "Item 1", the processor 120 may decide that the page orientation is the portrait-type page orientation in which the texts are written in the horizontal orientation.

Figure 7B:
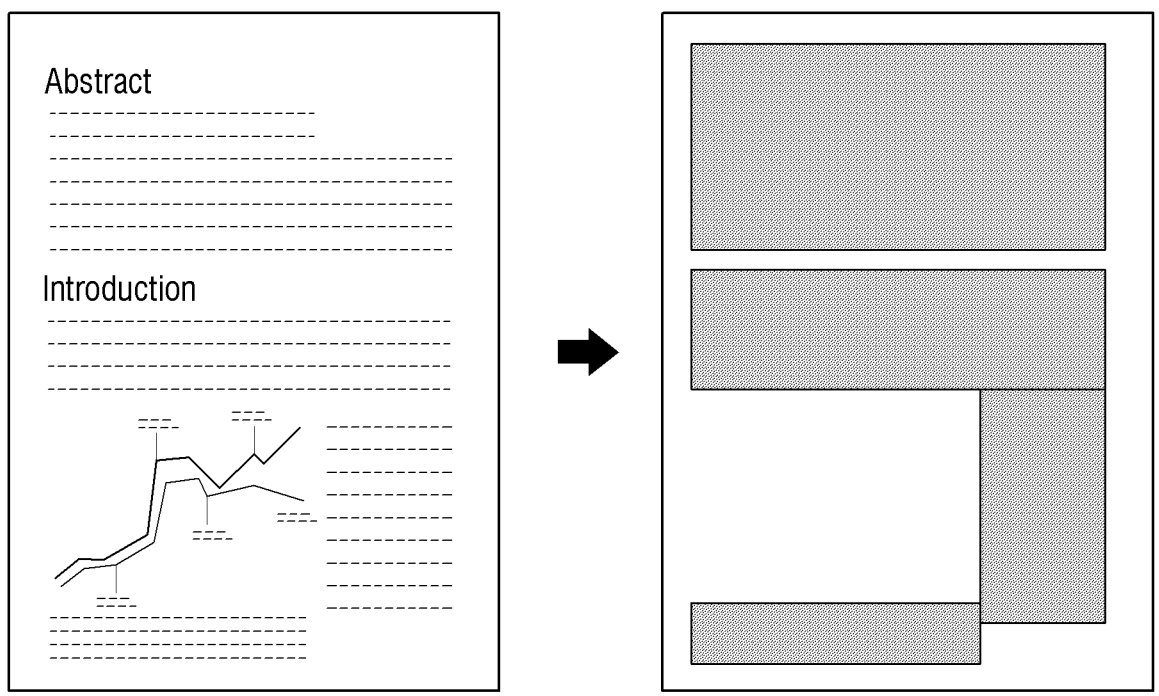

Referring to FIG. 7B, the processor 120 may divide a document in paragraph units, and recognize only some of texts in each paragraph to decide an orientation of the entire document.

Figure 7C:
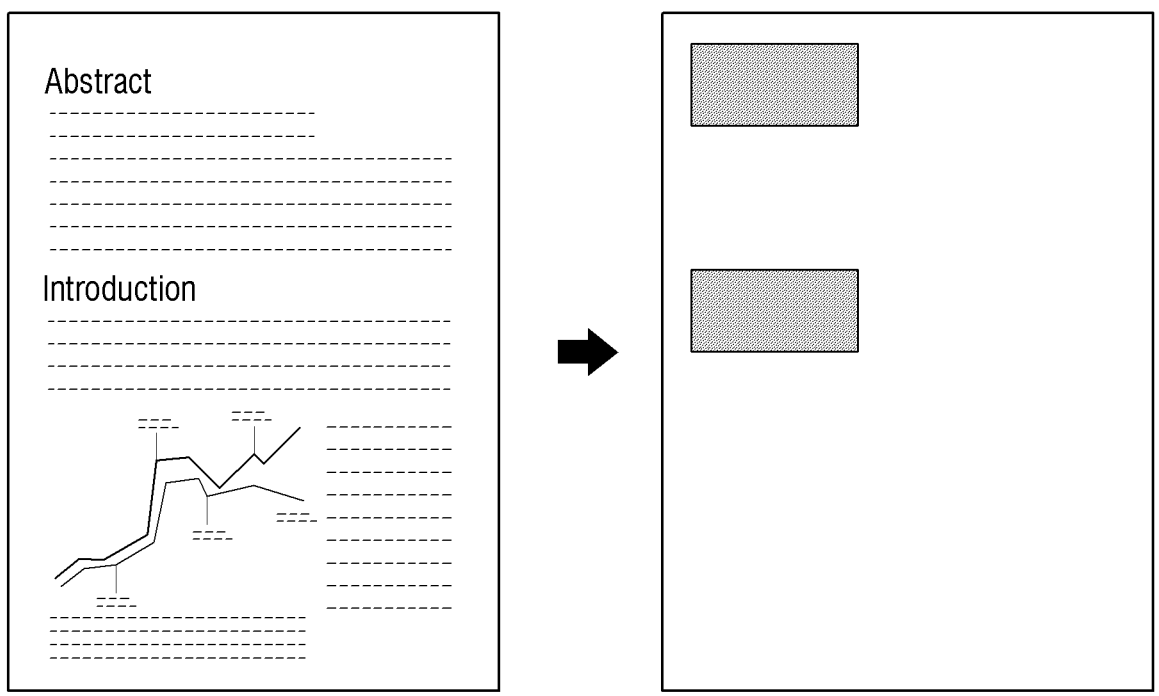

Referring to FIG. 7C, when a text having a size that is easily recognized is included in a paragraph, the processor 120 may preferentially perform recognition on the text having this size.

Figure 8:
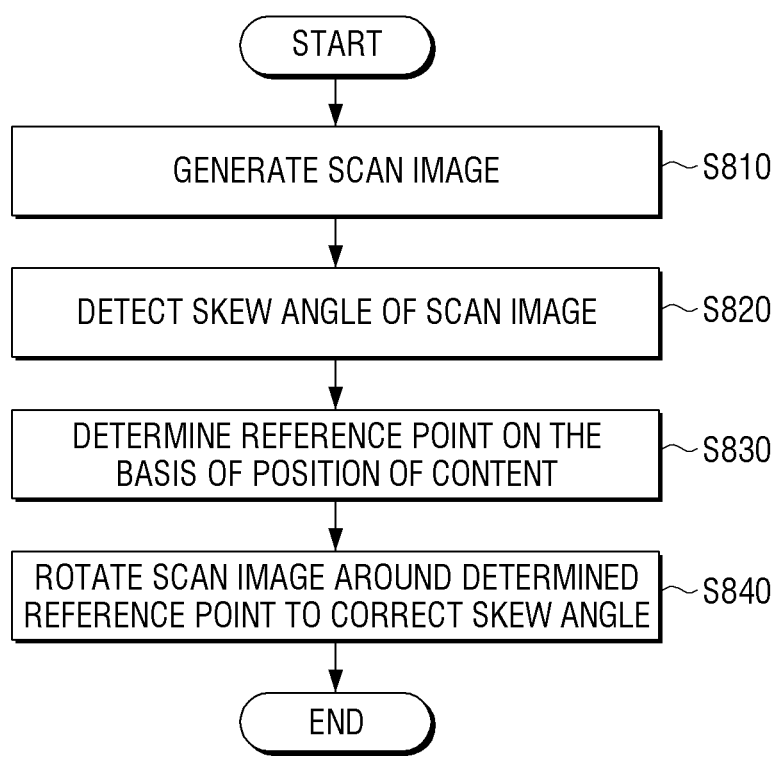
FIGS. 8 to 11 are flowcharts for describing scanned image correction methods according to various examples of the disclosure.

FIG. 8 is a flowchart for describing a scanned image correction method of the image forming apparatus 100 according to the example of the disclosure.

Referring to FIG. 8, the image forming apparatus 100 may generate a scanned image by scanning a document (S810). A skew may occur in the scanned image due to various causes, such as a case in which a user disposes the document in a skewed state during the generation of the scanned image, a case in which the document is disposed in a skewed state due to a non-constant speed, or the like, when an automatic document feeder feeds the document, a case of scanning/copying a thick book, or the like.

The image forming apparatus 100 may detect a skew angle of the generated scanned image (S820). As an example, the image forming apparatus 100 may detect a boundary of the document using the shadow of a profile of the document and detect the skew angle of the scanned image using the detected boundary. As another example, the image forming apparatus 100 may detect the skew angle of the scanned image on the basis of a content (or a document content).

The image forming apparatus 100 may determine a reference point around which it will rotate the scanned image on the basis of a position of the content (s830). In addition, the image forming apparatus 100 may rotate the scanned image around the determined reference point to correct the skew angle (S840). Then, the image forming apparatus 100 may print the corrected scanned image. The image forming apparatus 100 may store or transmit the corrected scanned image therein or to an external apparatus without printing the corrected scanned image.

Figure 9:
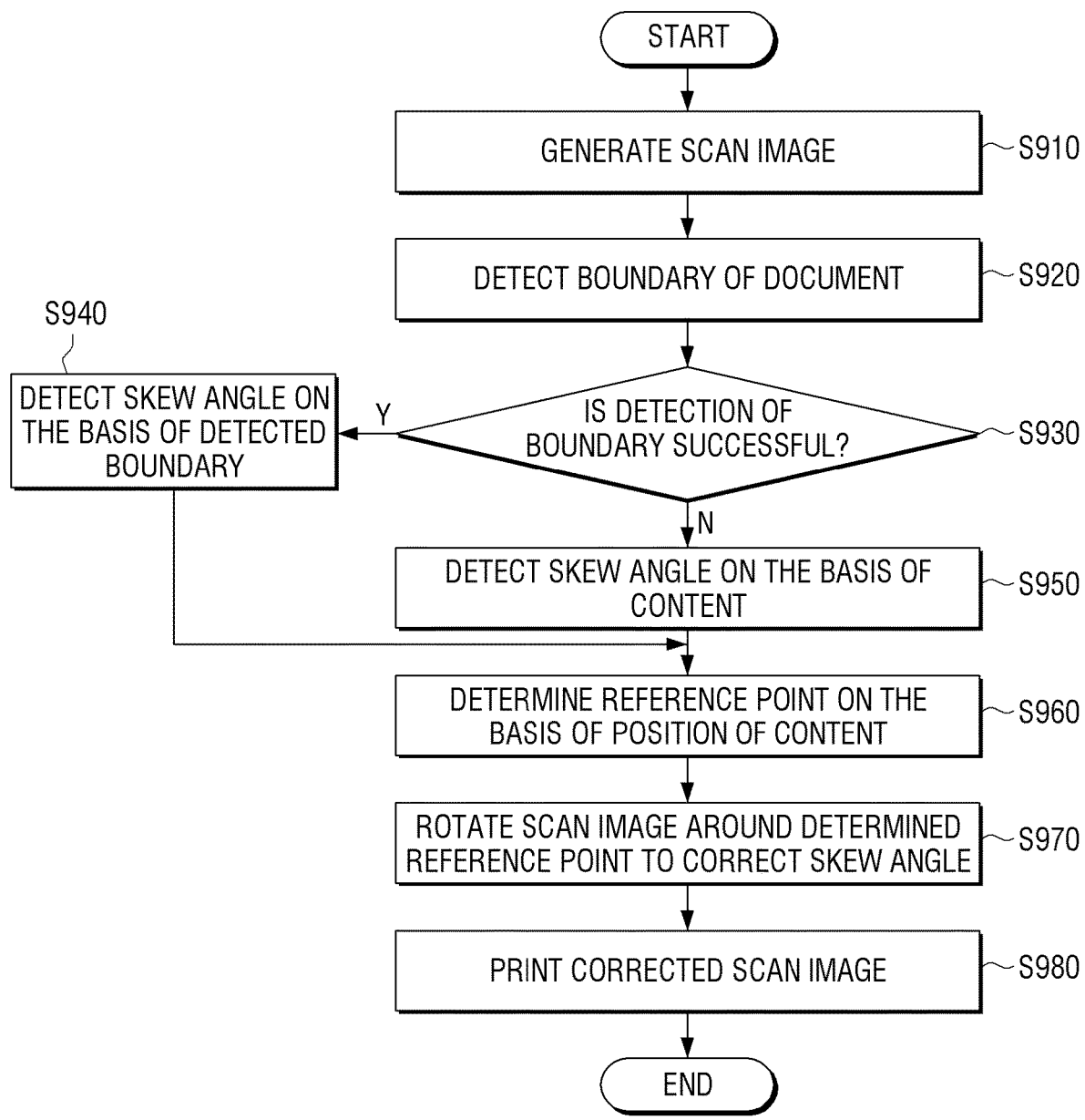

FIG. 9 is a flowchart for describing a scanned image correction method of the image forming apparatus 100 according to the example of the disclosure in more detail.

Referring to FIG. 9, the image forming apparatus 100 may generate a scanned image by scanning a document (S910). In addition, the image forming apparatus 100 may detect a boundary of the document (S920). In a case in which the boundary of the document is detected using the shadow of a profile of the document (S930-Y), the image forming apparatus 100 may detect a skew angle of the scanned image on the basis of the detected boundary (S940). Because the detection of the skew angle on the basis of the boundary of the document may be performed faster than detection of the skew angle on the basis of a content, the image forming apparatus 100 may preferentially attempt to detect the boundary of the document.

In a case in which the detection of the boundary of the document fails (S930-N), for example, in a case in which the profile of the document is damaged or in a case in which the document is scanned in a state in which a scan cover is opened, the image forming apparatus 100 may detect the skew angel of the scanned image on the basis of a content in the scanned image (S950). For example, the image forming apparatus 100 may detect a gradient of the content from a gradient of a character string, a gradient of a line of a chart, and/or a gradient of a video edge that are included in the scanned image. In addition, the image forming apparatus 100 may detect the skew angle of the scanned image from the gradient of the content.

After the skew angle is detected, the image forming apparatus 100 may determine a reference point around which it will rotate the scanned image. In a case in which the scanned image will be rotated simply around a central coordinate of the scanned image, there is a risk that a portion of the content will be cut off. Therefore, the image forming apparatus 100 may determine the reference point on the basis of a position of the content (S960). In a case in which the reference is determined on the basis of the position of the content, the possibility that the content will be cut off is reduced.

Then, the image forming apparatus 100 may rotate the scanned image around the determined reference point to correct the skew angle (S970). In addition, the image forming apparatus 100 may print the corrected scanned image (S980).

Figure 10:
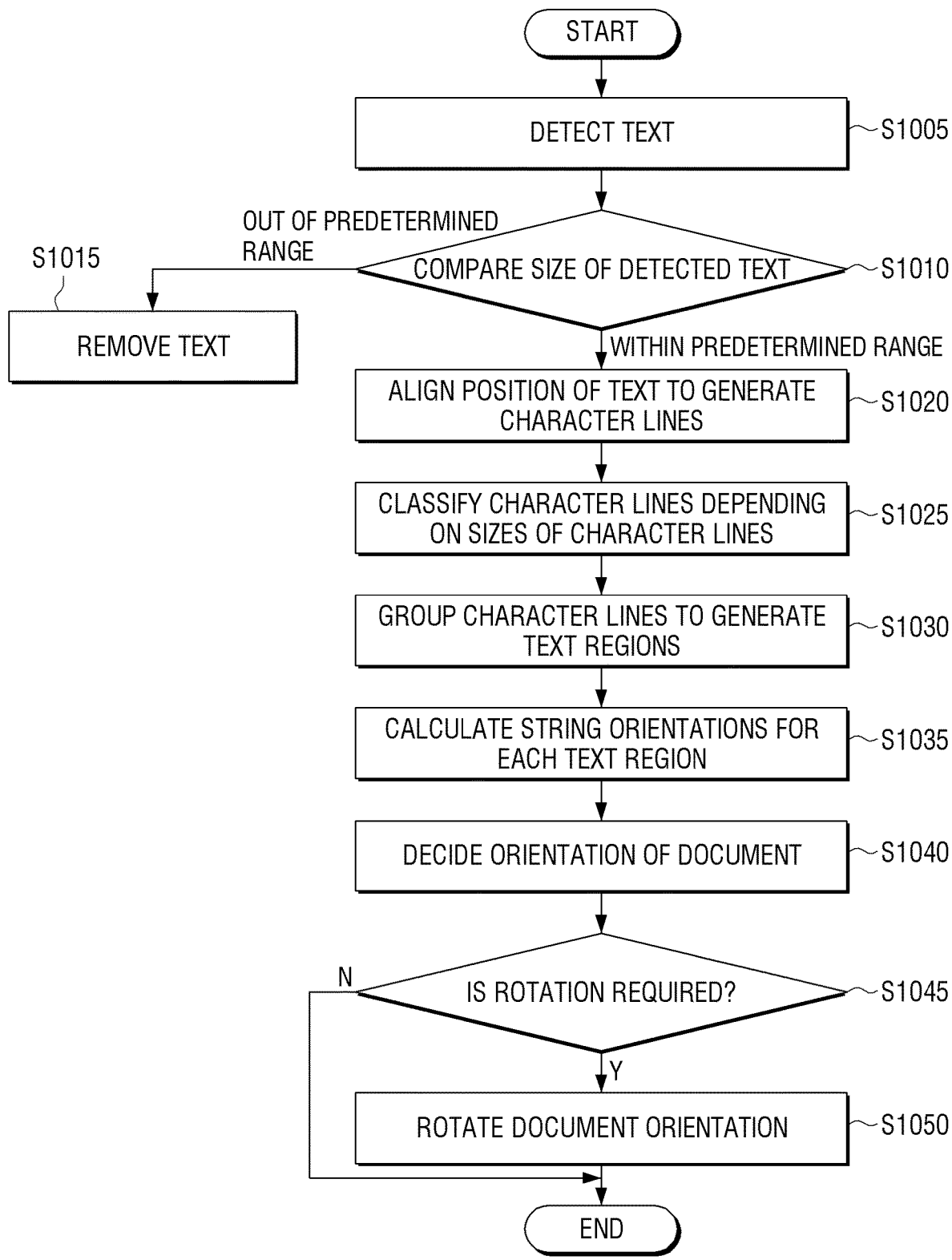

FIG. 10 is a flowchart for describing a document orientation correction method of the image forming apparatus 100 according to the example of the disclosure.

Referring to FIG. 10, the image forming apparatus 100 may detect a text within the scanned image (S1005). In addition, the image forming apparatus 100 may compare a size of the detected text with a predetermined range to confirm whether or not the size of the detected text is included in the predetermined range (S1010). For example, the predetermined range may be a size range set to be easily recognized by the image forming apparatus 100.

When the size of the detected size is out of the predetermined range, the image forming apparatus 100 may remove the detected text to allow the detected text not to be used in deciding the document orientation (s1015). On the other hand, when the size of the detected text is within the predetermined range, the image forming apparatus 100 may align a position of the text to generate character lines (S1020).

In addition, the image forming apparatus 100 may classify the character lines depending on sizes of the character lines (1025). For example, the image forming apparatus 100 may compare the sizes of the character lines with a predetermined size to classify the character lines into a class A and a class B. The image forming apparatus 100 may assign weights when calculating orientations for each paragraph in the future, depending on the classified classes.

Then, the image forming apparatus 100 may group the character lines to generate text regions (or paragraphs) (S1030). In addition, the image forming apparatus 100 may calculate string orientations for each text region (S1035). For example, the image forming apparatus 100 may perform string orientation calculation using an orientation of the text acquired as a result of performing OCR or a gradient of a connection angle between words.

The image forming apparatus 100 may decide an orientation of the entire document on the basis of orientations of the respective text regions to which the weights depending on the sizes of the character lines are assigned (S1040). In addition, the image forming apparatus 100 may detect an amount of required rotation from the respectively decided string orientation of the text regions, and compare the detected amount with a predetermined value to decide whether or not rotation of the scanned image is required (S1045). When it is decided that the rotation of the scanned image is required (S1045-Y), the image forming apparatus 100 may perform a correction process of rotating the orientation of the document (S1050).

Figure 11:
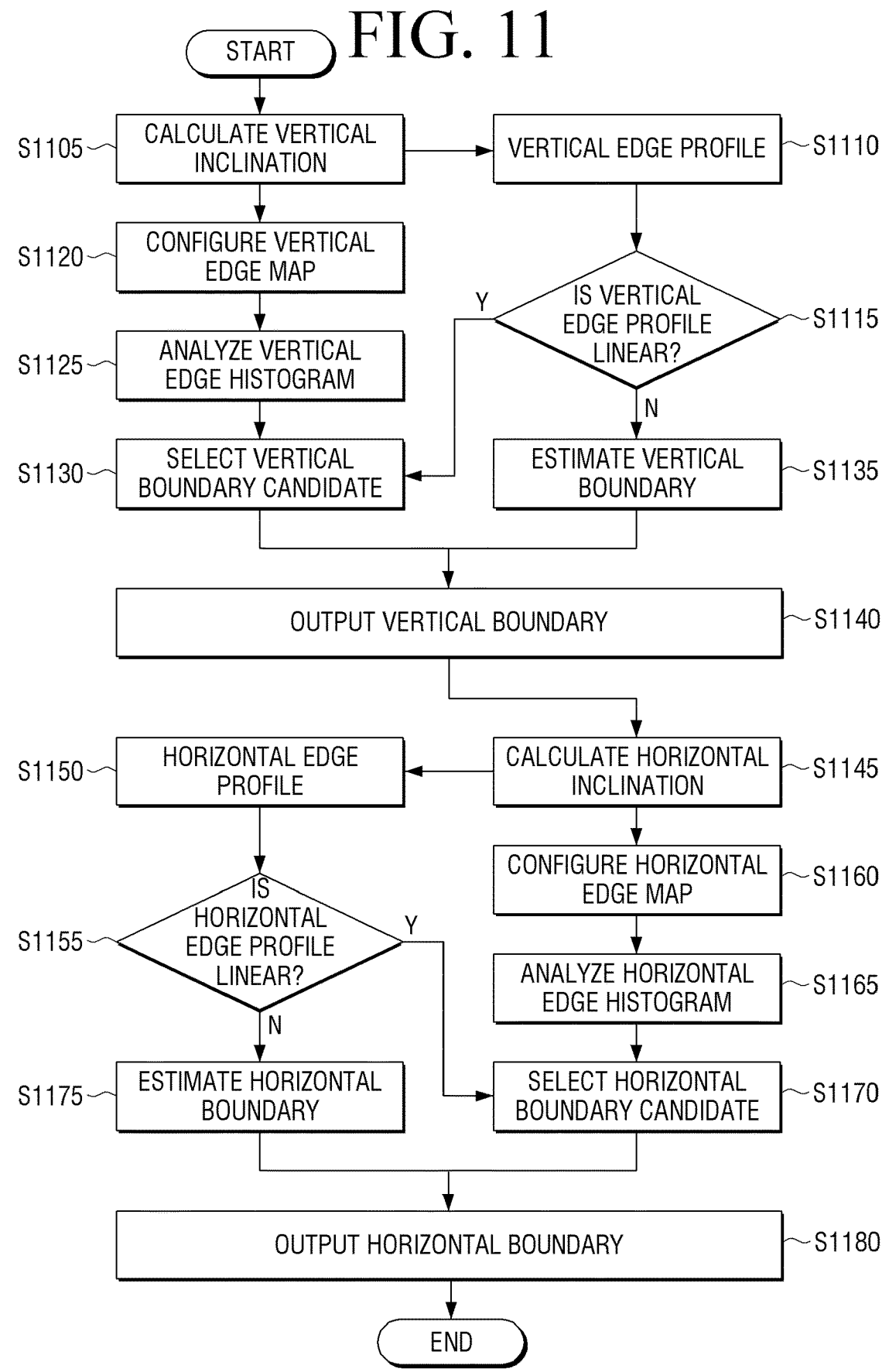

FIG. 11 is a flowchart for describing a boundary correction method of the image forming apparatus 100 according to the example of the disclosure. In a case of scanning or copying a thick document such as a book in a state in which the thick document is put on a glass flat plate of the image forming apparatus 100, an edge region other than the book is output in black depending on a size and a thickness of the book regardless of whether a cover is opened or closed. In addition, a distortion phenomenon occurs in a content such as a text present in a central region in which the book is folded. To correct such as distortion phenomenon, a boundary of the book needs to be accurately recognized. The image forming apparatus 100 according to the example of the disclosure may detect or estimate a position of the boundary through a profile analysis to solve this problem.

It is illustrated in the example of FIG. 11 that the image forming apparatus 100 outputs a vertical boundary and then outputs a horizontal boundary, but the image forming apparatus 100 may first output the horizontal boundary or perform processes for the vertical boundary and the horizontal boundary in parallel.

Even in a case in which it is difficult to grasp the boundary, for example, even in a case of copying the book, the image forming apparatus 100 may prevent damage to a profile of a finally scanned resultant by detecting an accurate boundary surface using the example of FIG. 11. For example, even in a case in which the book is put on an edge of a glass flat plate of the scan unit, such that a boundary of the document is cut off, the image forming apparatus 100 may estimate the boundary to prevent the content from being cut off and prevent another correction process from malfunctioning.

Referring to FIG. 11, the image forming apparatus 100 may calculate a vertical inclination of the scanned image (S1105). The vertical inclination refers to a level at which a vertical boundary of the scanned image is inclined. In a case in which the document is scanned in a skewed state, the image forming apparatus 100 needs to calculate the vertical inclination to perform a profile analysis, or the like, along an accurate boundary of the document.

Processes after a subsequent process of configuring a vertical edge map and processes after a subsequent process of configuring a vertical edge profile may be performed in parallel.

The image forming apparatus 100 may configure the vertical edge map in a vertical orientation on the basis of the calculated vertical inclination (S1120). An edge refers to a boundary of a region in an image or a video, and refers to a discontinuous point of a pixel brightness. That is, a brightness difference appears at a boundary between an object and a background. This corresponds to a profile of the object, and provides many pieces of information, such as a position, a shape, a size, and/or the like, of the object. Pixels corresponding to the edges are detected, and an image or a video represented by the edges detected as described above is called an edge map.

The image forming apparatus 100 may analyze a vertical edge histogram using the vertical edge map in the vertical orientation to select a vertical boundary candidate (S1125 and S1130). In detail, the image forming apparatus 100 may divide the scanned image into a plurality of pieces in the horizontal orientation. That is, the document may be divided in a form in which a plurality of pieces having a string shape elongated in the vertical orientation are disposed in the horizontal orientation. The image forming apparatus 100 may perform the vertical edge histogram analysis for analyzing shadows of the respective pieces. Because a probability that a peak value will be detected at a boundary portion of the document when the vertical edge histogram analysis is performed, the image forming apparatus 100 may select a portion at which the peak value is detected as the vertical boundary candidate.

In addition, the image forming apparatus 100 may detect the vertical edge profile (S1110). In detail, the vertical edge profile refers to analyzing a change in an edge while proceeding in the vertical orientation. For example, in a case in which an edge of the document is clearly scanned, an edge profile of an inner portion of the document has a straight-line shape. On the other hand, in a case in which the edge of the document is unclearly scanned, an edge profile of an inner portion of the document has an irregular wave shape. For example, in a case in which the boundary of the document is not scanned, such that the document is scanned as if the content in the document is the boundary, the edge profile has the irregular wave shape.

In a case in which the vertical edge profile is linear (S1115-Y), the image forming apparatus 100 may select the vertical boundary candidate through the vertical edge histogram analysis as the vertical boundary (S1130). Because the meaning that the vertical edge profile is linear is that the edge of the document is clearly scanned, the image forming apparatus 100 may determine that the vertical boundary candidate selected in the vertical edge histogram analysis is an accurate vertical boundary.

In a case in which the vertical edge profile is not linear (S1115-N), the image forming apparatus 100 may determine that the vertical boundary candidate through the vertical edge histogram analysis is not the actual vertical boundary. In addition, the image forming apparatus 100 may estimate the vertical boundary (S1135). Because the meaning that the vertical edge profile is not linear is that the content of the document is decided to be the edge, the image forming apparatus 100 may estimate a point spaced apart from the vertical boundary candidate by a predetermined distance as the vertical boundary.

The image forming apparatus 100 may output the selected or estimated vertical boundary (S1140). In addition, the image forming apparatus 100 may add a predetermined amount of margin from the output vertical boundary and then generate the scanned image.

Processes (S1145 to S1180) of outputting the horizontal boundary correspond to processes (S1105 to S1140) of outputting the vertical boundary, and an overlapping description is thus omitted.

Figure 12A:
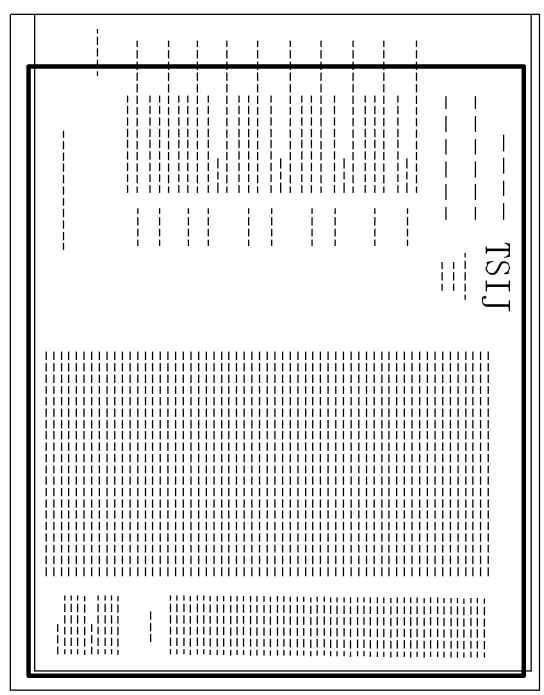
FIGS. 12A and 12B are example views for describing a correction method in a case in which a boundary line of a document is not detected.
Figure 12B:
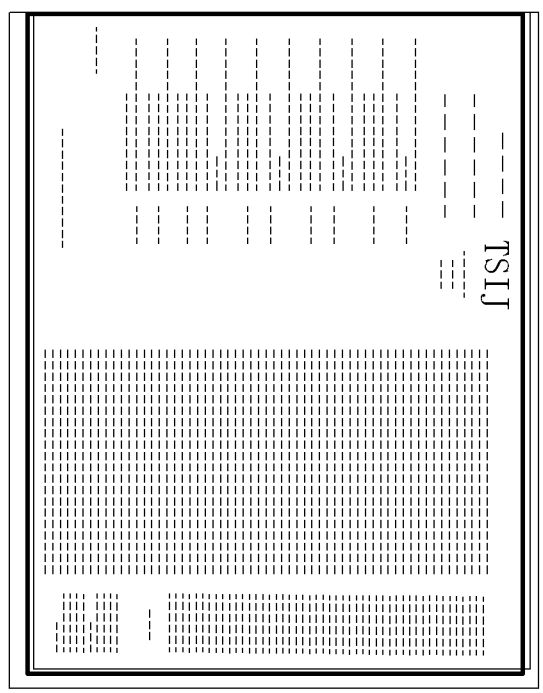

FIG. 12 illustrates a resultant scanned by a method according to the related art, and it may be confirmed from FIG. 12A that a content of a document is lost. On the other hand, according to the example of the disclosure, it may be confirmed that a content of a document is not lost by estimating a boundary line of the document as illustrated in FIG. 12B.

According to the diverse examples as described above, the image forming apparatus 100 may correct the skew of the document that may occur at the time of scanning the document. In addition, the image forming apparatus 100 may correct the skew of the document on the basis of the content of the document, and thus prevent loss of the image after the correction of the skew.

In addition, the image forming apparatus 100 may allow an orientation of a scan document and an orientation of a sentence in the document to coincide with each other to improve readability. In addition, the image forming apparatus 100 may detect or estimate an accurate boundary surface to prevent damage to the profile of the finally scanned resultant.

Meanwhile, the examples described above may be implemented in a form of computer-readable recording medium storing computer-executable instructions and data. At least one of the instructions and data may be stored in a form of a program code, and may perform a predetermined operation by generating a predetermined program module when being executed by the processor.

The computer-readable recording medium may refer to, for example, a magnetic storage medium such as a hard disk, an optical reading medium such as a compact disk (CD) and a digital versatile disk (DVD), or the like, and may refer to a memory included in a server accessible through a network. For example, the computer-readable recording medium may be at least one of the memory 160 of the image forming apparatus 100 and a memory of the input/output unit 140, or may be a memory included in an external apparatus connected to the image forming apparatus 100 through a network.

Although the disclosure has been described with reference to the examples and the accompanying drawings, the disclosure is not limited to the abovementioned examples, but may be variously modified and altered from the above description by those skilled in the art to which the disclosure pertains. Therefore, the scope of the disclosure is not construed as being limited to the examples described above, but should be defined by the following claims as well as equivalents thereto.

The invention claimed is:

1. An image forming apparatus comprising:
a scan unit to scan a document to generate a scanned image; and
a processor to,
detect a skew angle of the scanned image,
determine, as a reference point, a central coordinate position of a content detected, among a plurality of contents detected, included in the scanned image, based on,
detecting the plurality of contents, and deciding sizes and central coordinate positions of respective contents of the plurality of contents,
assigning weights to the central coordinate positions of the respective contents depending on the sizes of the respective contents, and
determining the reference point on a basis of the weighted central coordinate positions of the respective contents; and
use the reference point as a center point of a rotation to rotate the scanned image around the reference point to correct the detected skew angle.

2. The image forming apparatus as claimed in claim 1, wherein the processor detects a boundary of the document from the scanned image and detects the skew angle of the scanned image on a basis of the boundary.

3. The image forming apparatus as claimed in claim 2, wherein the processor detects the content, and detects the skew angle of the scanned image on a basis of a gradient of the content when the boundary of the document is not detected.

4. The image forming apparatus as claimed in claim 3, wherein the processor detects the gradient of the content using at least one of a gradient of a character string, a gradient of a line of a chart, or a gradient of a video edge which is included in the scanned image.

5. The image forming apparatus as claimed in claim 1, further comprising an input/output unit to display a screen and receive a user input,
wherein the processor controls the input/output unit to display a user interface through which one of a plurality of methods of detecting the skew angle of the scanned image is selected, and detects the skew angle of the scanned image by the selected method according to a user input selecting one of the plurality of methods.

6. The image forming apparatus as claimed in claim 5, wherein the plurality of methods includes a first method of detecting the skew angle by detecting a boundary of the document, a second method of detecting the skew angle by detecting the content in the scanned image, and a third method of performing the second method when the skew angle is not detected by the first method.

7. The image forming apparatus as claimed in claim 1, wherein the processor detects a plurality of text regions as the content detected in the scanned image, and decides a page orientation of the scanned image on a basis of string orientations of each of the plurality of text regions.

8. The image forming apparatus as claimed in claim 7, wherein the processor detects a text region, among the text regions, having a predetermined text size.

9. The image forming apparatus as claimed in claim 7, wherein the processor detects an amount of required rotation from the string orientations of the text regions, and rotates the scanned image in the page orientation of the scanned image when the amount of the required rotation is larger than a predetermined value.

10. A scanned image correction method of an image forming apparatus, comprising:
generating a scanned image by scanning a document;
detecting a skew angle of the scanned image;
determining, as a reference point, a central coordinate position of a content detected, among a plurality of contents detected, included in the scanned image, based on,
detecting the plurality of contents, and deciding sizes and central coordinate positions of respective contents of the plurality of contents,
assigning weights to the central coordinate positions of the respective contents depending on the sizes of the respective contents, and
determining the reference point on a basis of the weighted central coordinate positions of the respective contents; and
rotating the scanned image around the reference point to correct the skew angle, using the reference point as a center point of the rotating to correct the detected skew angle.

11. The scanned image correction method as claimed in claim 10, wherein the detecting of the skew angle includes:
detecting a boundary of the document from the scanned image; and
detecting the skew angle of the scanned image on a basis of the boundary.

12. The scanned image correction method as claimed in claim 11, wherein the detecting of the skew angle is on a basis of a gradient of the detected content when the boundary of the document is not detected.

13. The scanned image correction method as claimed in claim 12, wherein in the detecting of the skew angle, the gradient of the content is detected using at least one of a gradient of a character string, a gradient of a line of a chart, or a gradient of a video edge which is included in the scanned image.

14. The scanned image correction method as claimed in claim 10, further comprising displaying a user interface through which one of a plurality of methods of detecting the skew angle of the scanned image is selected,
wherein in the detecting of the skew angle, the skew angle of the scanned image is detected by a method selected according to a user input selecting one of the plurality of methods.

* * * * *